United States Patent
Buer et al.

(10) Patent No.: US 7,035,617 B2
(45) Date of Patent: Apr. 25, 2006

(54) HIGH POWER BLOCK UPCONVERTER

(75) Inventors: Kenneth V. Buer, Mesa, AZ (US); Richard S. Torkington, Mesa, AZ (US); Edwin Jack Stanfield, Queen Creek, AZ (US)

(73) Assignee: U.S. Monolithics, L.L.C., Chandler, AZ (US)

( * ) Notice: Subject to any disclaimer, the term of this patent is extended or adjusted under 35 U.S.C. 154(b) by 446 days.

(21) Appl. No.: 10/066,024

(22) Filed: Jan. 29, 2002

(65) Prior Publication Data

US 2002/0102959 A1 Aug. 1, 2002

Related U.S. Application Data

(60) Provisional application No. 60/264,802, filed on Jan. 29, 2001.

(51) Int. Cl.
*H04B 1/26* (2006.01)
(52) U.S. Cl. .............. 455/326; 455/323; 455/327; 331/96; 343/700 MS
(58) Field of Classification Search ........ 455/323–326, 455/329, 313–319, 128, 127.5, 127.1, 209, 455/126, 188.1, 189.1, 190.1, 552–553, 353, 455/333; 330/129, 286, 306, 295; 333/29.2, 333/1.1, 24.2, 245–247, 260, 248; 257/699; 343/700 MS, 841, 883, 701–705, 853; 331/96, 331/108 C, 117 D, 117 FE, 172, 177 R
See application file for complete search history.

(56) References Cited

U.S. PATENT DOCUMENTS

| | | | | |
|---|---|---|---|---|
| 5,526,525 A | * | 6/1996 | Minowa et al. | 455/90.3 |
| 6,078,101 A | * | 6/2000 | Aizenberg et al. | 257/699 |
| 6,160,454 A | * | 12/2000 | Buer et al. | 330/295 |
| 6,317,003 B1 | * | 11/2001 | Kobayashi | 330/306 |
| 6,462,628 B1 | * | 10/2002 | Kondo et al. | 333/24.2 |
| 6,535,546 B1 | * | 3/2003 | Bethscheider et al. | 375/145 |
| 6,542,035 B1 | * | 4/2003 | Cook et al. | 330/286 |
| 6,570,442 B1 | * | 5/2003 | Nakai et al. | 330/129 |
| 6,597,925 B1 | * | 7/2003 | Garcia et al. | 455/561 |

FOREIGN PATENT DOCUMENTS

EP 624004 A1 * 11/1994

* cited by examiner

*Primary Examiner*—Pablo N. Tran
(74) *Attorney, Agent, or Firm*—Snell & Wilmer L.L.P.

(57) ABSTRACT

A system and method for high power block upconversion having a stand-alone and surface-mountable component is provided. The HP-BUC system of the invention provides a "drop-in" component capable of mixing a local oscillator signal with an IF signal to produce an RF signal in the millimeter-wave and higher bands. In addition, the HP-BUC provides filtering of unwanted spurious signals and requires no further signal amplification prior to transmission, for example in a satellite communications system.

16 Claims, 6 Drawing Sheets

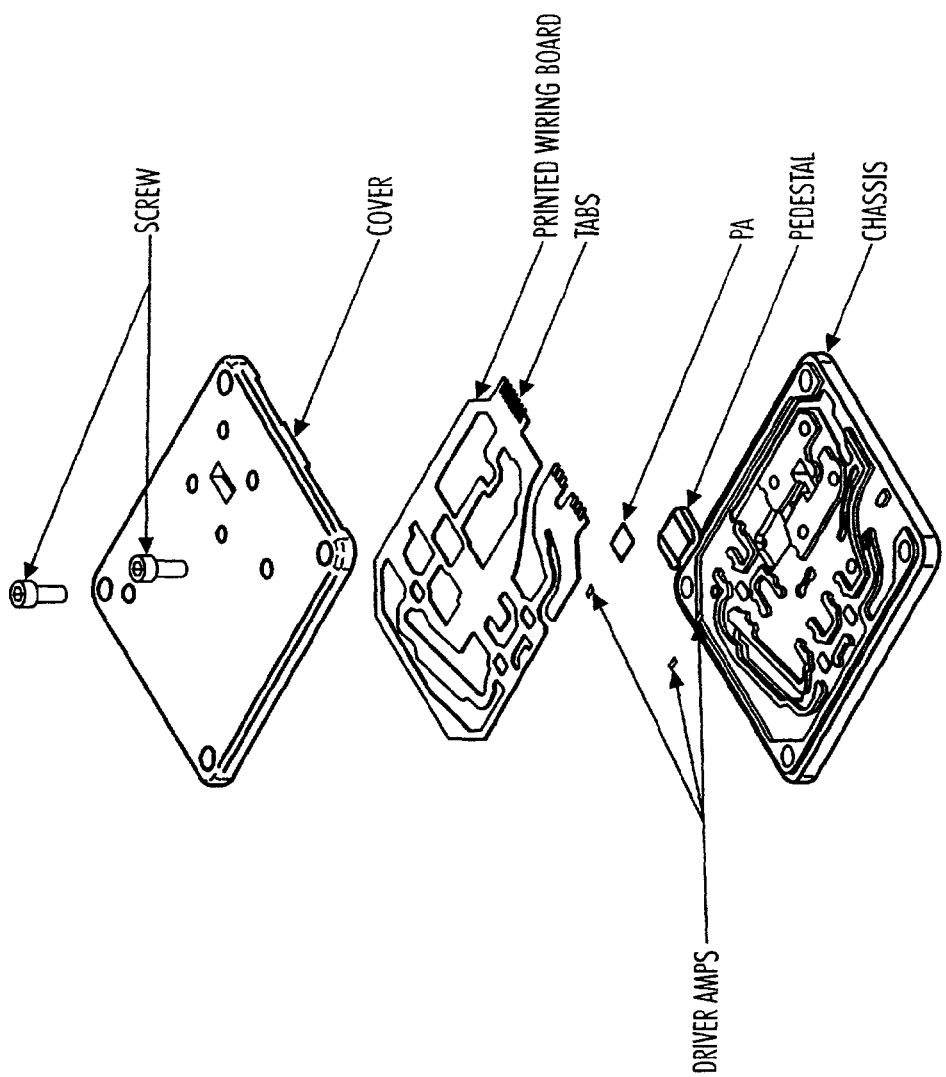

HIGH POWER BLOCK UPCONVERTER

CROSS REFERENCE TO RELATED APPLICATIONS

This application includes subject matter that is related to and claims priority from U.S. Provisional Patent Application Ser. No. 60/264,802, filed Jan. 29, 2001, under the same title.

FIELD OF INVENTION

The present invention relates, generally, to a system and method for block upconvert, and in particular, to a high power block upconverter system and method for implementing the same.

BACKGROUND OF THE INVENTION

In general, the transmitting satellite ground terminal station of a communication system includes a block upconverter (BUC) for mixing signals to generate a radio frequency (RF) signal. The BUC is typically a high frequency component which generally requires more detailed and expensive manufacturing processes. In fact, the BUC is often times the most costly part of the ground terminal station.

Ground terminal stations operating in excess of 20 GHz often use a "chip and wire" methodology (module packaging with unpackaged semiconductors and unpackaged wirebonds) to intraconnect the high frequency BUC to the remaining low frequency parts. This methodology increases the complexity of assembly and increases the overall cost.

Another methodology for manufacturing ground terminal stations relates to a "mixed" technology of chip and wire methods with standard surface mount technology. For example, chip and wire techniques are used to interconnect the high frequency BUC components and surface mount techniques are used to interconnect the remaining low frequency parts. This methodology presents manufacturing problems in that two separate assembly processes are required.

Stand-alone BUC systems have been developed to overcome some of these prior art problems. However, these systems, do not offer high power amplifier output, and thus usually require signal amplification before transmission. In addition, these stand-alone BUC systems are not configured as surface-mountable components. Moreover, these systems are not configured to operate in the millimeter-wave and higher bands.

BRIEF DESCRIPTION OF THE DRAWINGS

These and other features, aspects and advantages of the present invention will become better understood with reference to the following description, appending claims, and accompanying drawings where:

FIGS. 5a and 5b illustrate various views of a HP-BUC system in accordance with yet another embodiment of the invention.

DETAILED DESCRIPTION

The subject matter of the present invention is particularly suited for use in connection with a satellite ground terminal in a communication system, and more particularly in connection with frequencies in the millimeter-wave and higher bands. As a result, the preferred exemplary embodiment of the present invention is described in that context. It should be recognized, however, that such description is not intended as a limitation on the use or applicability of the present invention, but is instead provided merely to enable a full and complete description of a preferred embodiment.

Generally, a high power block upconverter (HP-BUC) system according to various aspects of the invention provides a surface-mountable component for mixing a subharmonic local oscillator (LO) signal with an intermediate frequency (IF) signal to produce a radio frequency (RF) signal, in particular, an RF signal at millimeter wave bands. The HP-BUC system is particularly suited for K band satellite transceiver communications; however, it should be appreciated that the present invention has applicability to other frequency bands. In addition, a HP-BUC system according to various aspects of the invention provides filtering of unwanted spurious signals resulting from the mixer and RF signal power amplification. Moreover, a HP-BUC system of the invention provides a reduced cost "drop-in" component. The complexity of the present system is reduced by optimally separating high frequency "chip and wire" assembly from low cost surface mount technology. Yield is improved due to a higher percentage of the system being assembled using robust surface mount technology.

Figure 1:
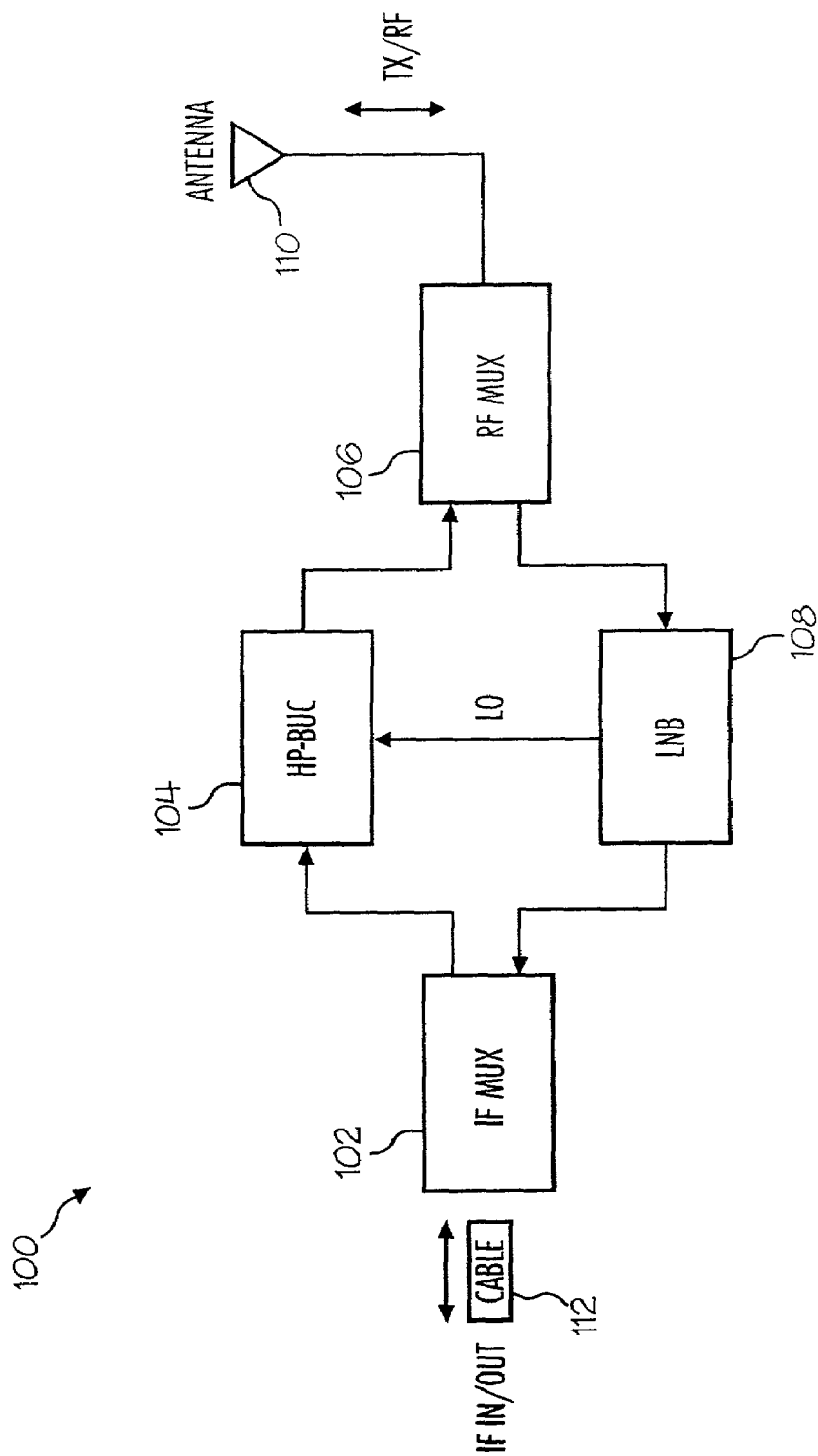
FIG. 1 illustrates, in block format, a satellite ground terminal station system in accordance with one embodiment of the present invention.

FIG. 1 illustrates a satellite ground terminal system 100 according to one embodiment and one application of the present invention. System 100 includes an IF multiplexer 102, an HP-BUC 104 in accordance with the present invention, an RF multiplexer 106, a low noise block downconverter (LNB) 108, an antenna 110, and a cable 112. IF multiplexer 102 combines an IF input signal and an IF output signal (typically the signals are at different frequencies) onto a single cable. IF multiplexer 102 provides a means of separating the two signals based on frequency selectivity.

In a similar manner, RF multiplexer 106 combines (and separates) an outbound transmission RF signal and an inbound receiver RF signal onto a single antenna based on frequency selectivity.

Antenna 110 receives and transmits an RF signal according to the application of the system. Antennas, such as an antenna for use in system 100, are generally known and will not be discussed in detail herein. Antenna 100 may comprise various types and/or combinations of antennas, to include, but not limited to, dish reflector, horn, passive or active phased array, and the like.

In general, LNB 108 receives an RF signal from RF multiplexer 106 and converts the signal to an IF signal. In one particular embodiment, LNB 108 may include a suitable LO source for generating an LO signal.

Cable 112 interconnects system 100 to other parts of the communications system and is suitably configured to transfer one or more IF signals. Cable 112 may comprise any suitable cable used for signal transmission. For example, a standard coaxial cable, such as RG-6, is well suited for this application. While various types of cables may be used, such as fiber optic, or even wireless radio connections, in general, low cost, readily available cable is often desirable.

HP-BUC 104, in accordance with the invention, is configured to convert the transmit IF signal to the transmit RF signal. In addition, HP-BUC 104 suitably provides signal filtering and power amplification.

Figure 2:
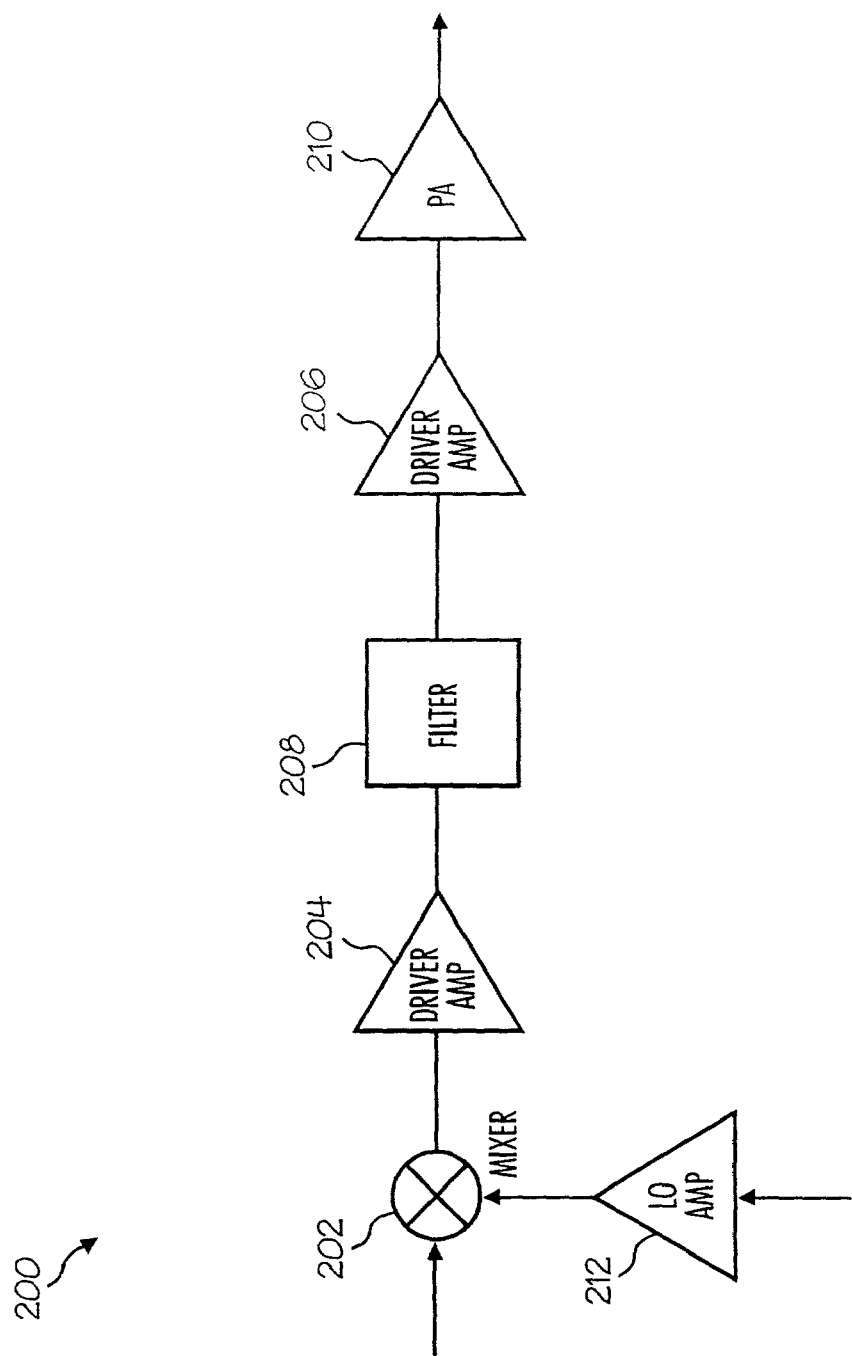
FIG. 2 illustrates, in block format, a HP-BUC (high power block upconverter) system in accordance with one embodiment of the present invention.

Referring now to FIG. 2, a HP-BUC system 200 in accordance with one embodiment of the invention is shown in block format. HP-BUC 200 includes a mixer 202, driver amps 204 and 206, a filter 208, a power amplifier 210, and an LO amplifier 212. HP-BUC 200 is suitably configured as a signal component that may be easily interconnected to various other components of the satellite ground terminal, e.g., system 100, using standard surface mount batch (or manual) solder reflow assembly methods.

Mixer 202 provides the upconvert function from the IF frequency to the RF frequency using the LO signal from LO amplifier 212. In one particular embodiment, mixer 202 includes a subharmonic upconvert mixer to reduce the LO frequency needed at the external interface. Inclusion of the mixer enables the input frequencies to be at a level suitable for surface mount assembly techniques, e.g., below the Ku band. The subharmonic LO signal typically reduces the LO frequency, thereby simplifying the external interconnection interface.

Driver amplifiers 204 and 206 comprise one or more amplification stages for the RF signal. As is typical in RF signal communication systems, some signal loss maybe experienced due to, for example, signal mixing. Driver amplifiers 204 and 206 are configured to provide suitable signal amplification of the RF signal to overcome any signal losses associated with the transmission.

Filter 208 may comprise any suitable filtering means, for example, a band pass filter. Filter 208 rejects unwanted spurious signals resulting from mixer 202.

Power amplifier 210 may comprise any known or discovered amplification device(s) or element(s) for a high power multi-stage amplification. Generally, power amplifier 210 transmits the RF signal directly to the antenna without further RF amplification.

In this particular embodiment, LO amplifier 212 amplifies the LO signal received from the block downconverter (not shown) or equivalent LO source; however, it should be noted that LO amplifier 212 may not be necessary in all applications, for example, those having high LO levels.

Figure 3:
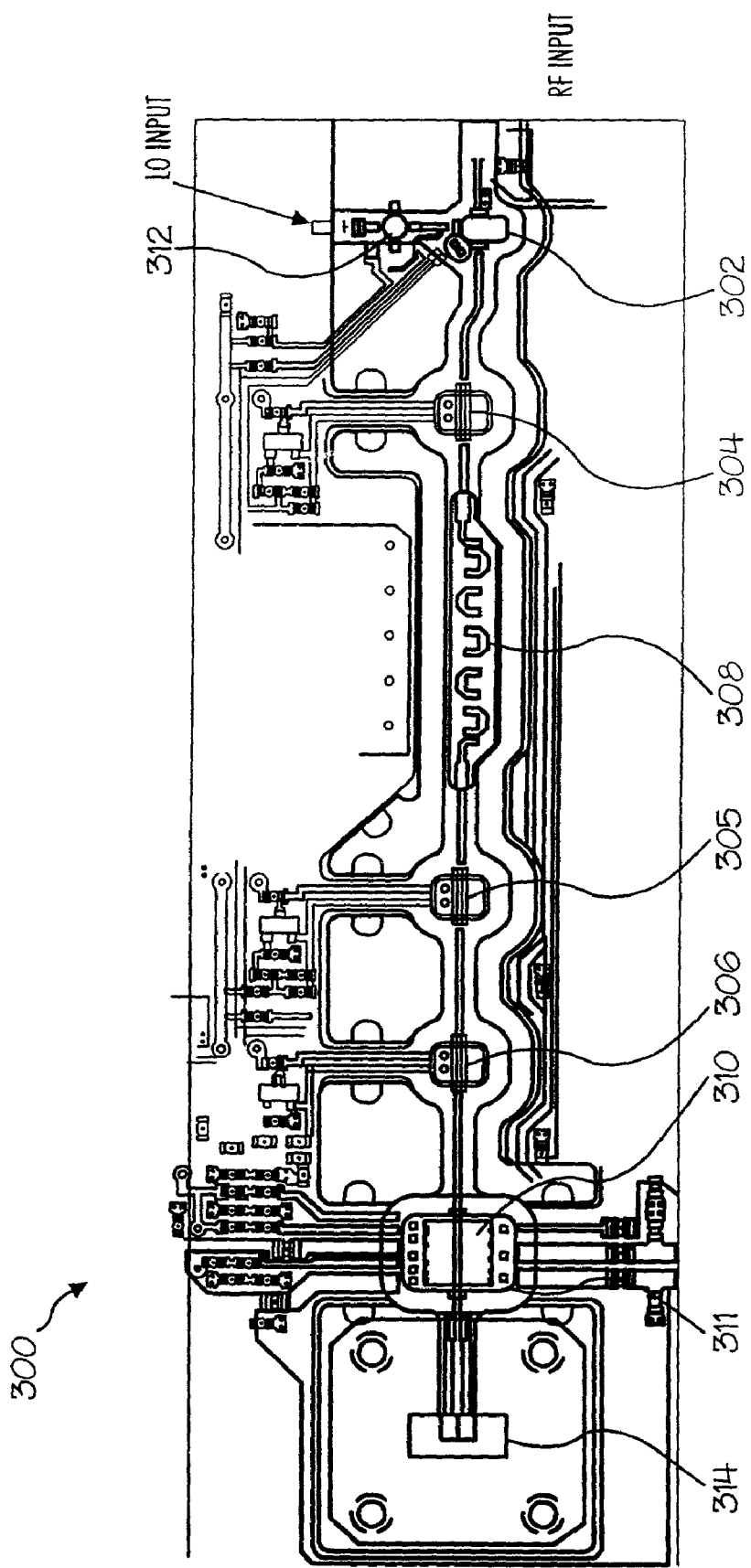
FIG. 3 illustrates a detailed layout of a HP-BUC system in accordance with one embodiment of the present invention.

Referring now to FIG. 3, a HP-BUC system 300, in accordance with an embodiment of the present invention, is illustrated. As shown, HP-BUC system 300 is a plane view detailed layout of one exemplary embodiment, including various components. System 300 includes a subharmonic mixer 302, driver amplifiers 304–306, a filter 308, a power amplifier 310, an LO amplifier 312, and a waveguide output port 314.

Mixer 302 may comprise any suitable high frequency mixer, such as a gallium arsenide MMIC-based subharmonic mixer. Similar to mixer 202, mixer 302 provides the upconvert function from the IF frequency to the RF frequency using the LO signal from LO amplifier 312.

As previously mentioned for system 200, amplification of the RF signal may include one or more amplification devices. In the present embodiment, driver amplifiers 304–306 are configured to amplify an RF signal such that any losses associated with signal transmission may be substantially overcome. In one particular embodiment, driver amplifiers 304–306 may comprise three-stage gallium arsenide MMIC-based amplifiers capable of providing roughly 0.25 watts output and approximately 15 dB of signal gain.

Filter 308, in this embodiment, comprises a hairpin suspended stripline band pass filter. However, this particular embodiment is merely exemplary; thus, various other filtering elements, capable of substantially rejecting spurious signals from the mixer 302, may be equally suited.

Power amplifier 310 may comprise any suitable high power amplification device. Preferably, power amplifier 310 is configured to provide roughly 15 dB signal gain. In one particular embodiment, power amplifier 310 may comprise a 4 watt gallium arsenide MMIC based amplifier.

The amplifiers employed in the present HP-BUC system and methods preferably are interconnected to microstrip or stripline transmission lines using proprietary wirebond interconnects.

In this embodiment, power amplifier 310 is coupled to an insert 311. Insert 311 provides an attachment surface for power amplifier 310. Preferably, insert 311 comprises a material having high thermal conductivity, e.g., a metallic. In addition, insert 311 may exhibit thermal expansion properties that substantially match the material of power amplifier 310, e.g., gallium arsenide. Insert 311 provides heat conduction by "spreading" generated heat away from power amplifier 310.

LO amplifier 312 may comprise any suitable amplification device capable of amplifying an LO signal received from a block downconverter (not shown) or equivalent LO source. For example, LO amplifier 312 may include a discrete gallium arsenide amplifier in a surface mount package.

HP-BUC system 300 further includes a plurality of bias circuitry which powers and controls the amplifiers. Bias circuitry may include, for example, one or more resistors, capacitors, inductors, transistors, or ferrites.

Waveguide output port 314 provides a low loss transition from a microstrip transmission line to suspended stripline transmission line to waveguide transmission. Preferably, the RF signal transmission lines are channelized.

Figure 4B:
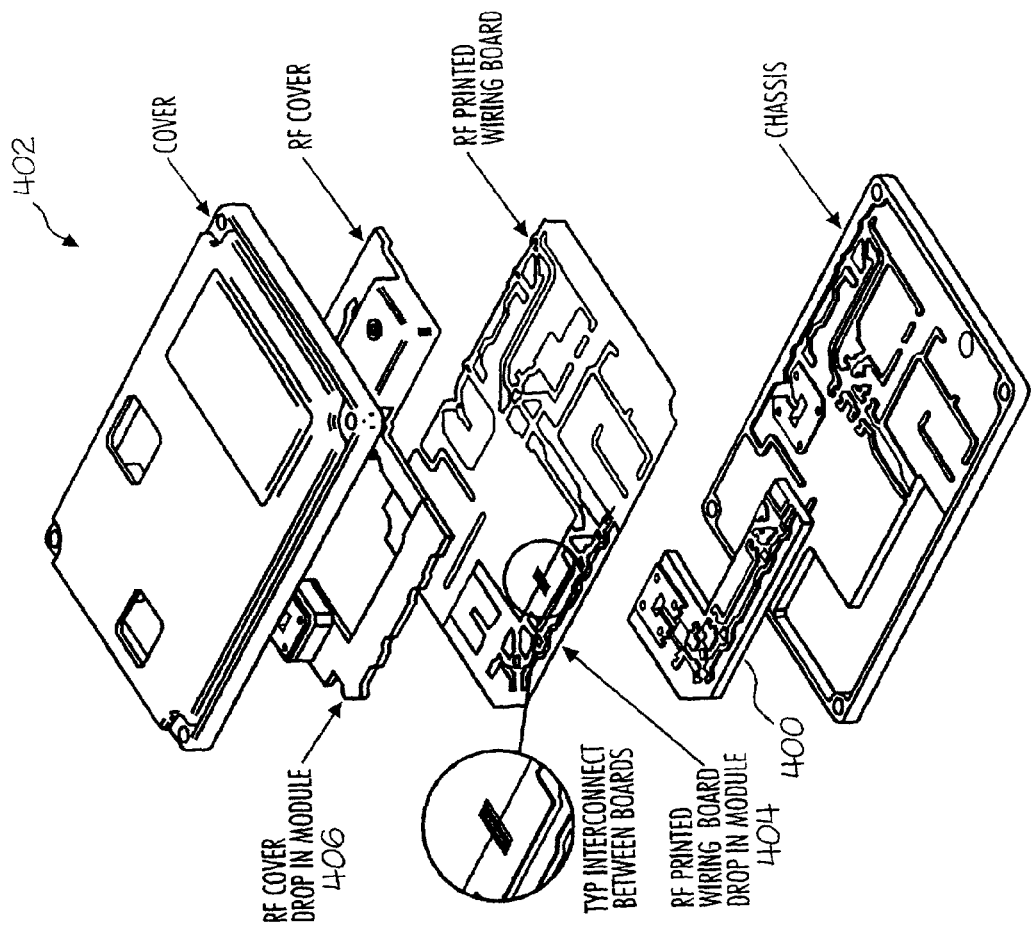
FIGS. 4a and 4b illustrate exploded views of a HP-BUC system in accordance with an embodiment of the invention, and a ground terminal station, respectively.
Figure 4A:
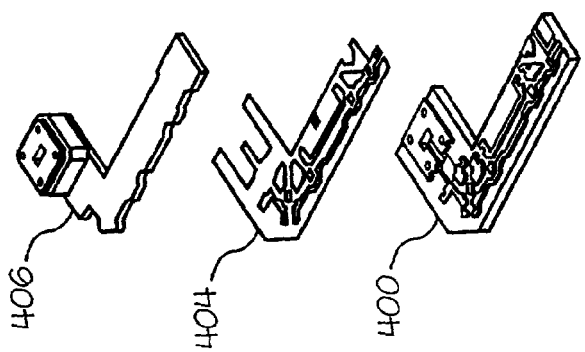

FIGS. 4a and 4b illustrate, in exploded views, one embodiment of a HP-BUC system 400 of the invention and a ground terminal system 402, respectively. HP-BUC system 400 is similar to the previously described systems 200 and 300 and includes substantially the same components. Also illustrated in the Figures, is an RF printed wiring board 404 and an RF cover 406 for use with HP-BUC system 400. The three elements, 400, 404 and 406, when combined, create a complete stand-alone drop-in component. RF cover 406 and the outer-base of HP-BUC system 400 may comprise a strong, metal material for durability as well as signal isolation.

The present Figures demonstrate the "drop-in" capabilities of HP-BUC system 400 into ground terminal system 402. As illustrated and previously described, HP-BUC system 400 is a surface-mountable component. In this particular embodiment, HP-BUC system 400 electrically connects to system 402 via numerous interconnects or tabs (generally shown in FIG. 4b).

Figure 5B:
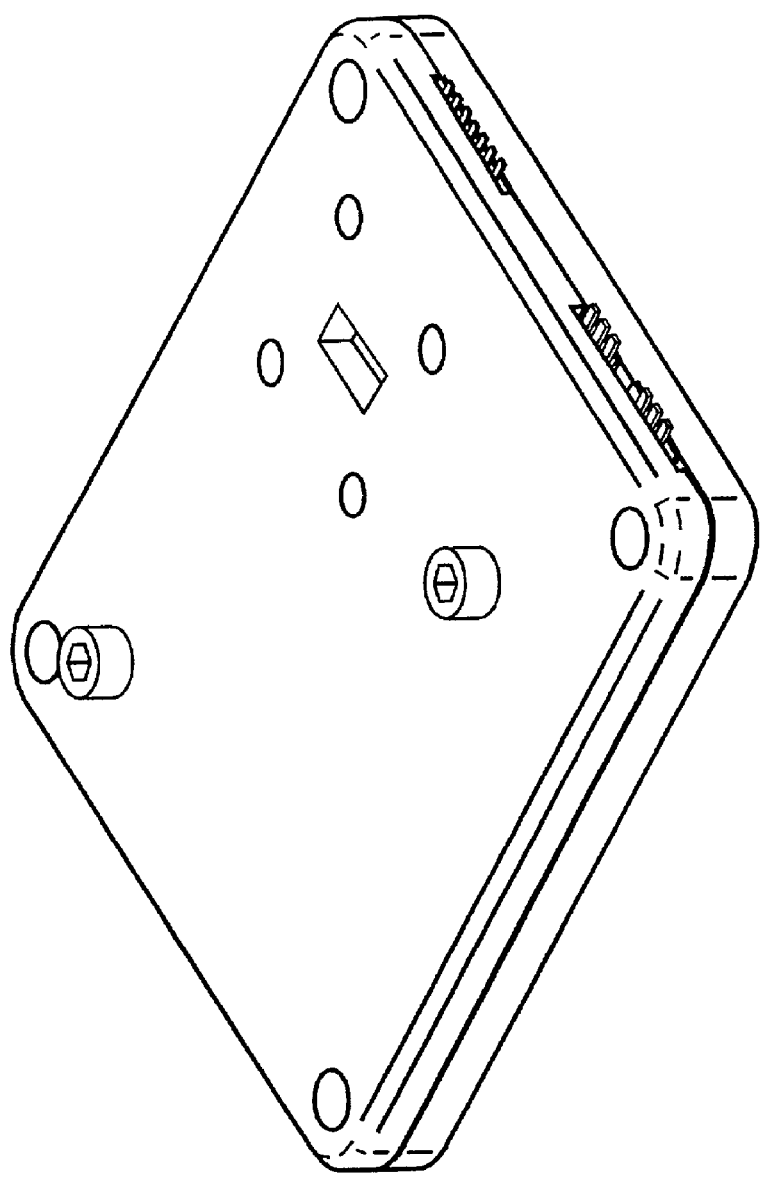

FIGS. 5a and 5b, illustrate another embodiment of a HP-BUC system of the invention. Similar to the HP-BUC systems described in FIGS. 4a and 4b, the present embodiment includes a complete stand-alone HP-BUC system having "drop-in" capabilities. The present embodiment includes similar components and features as the previously described HP-BUC systems of the invention. In this particular embodiment the overall shape of the HP-BUC was modified to provide a more compact and uniform shape. Thus, depending upon the particular application, certain shapes of the HP-BUC system may be better suited for easy drop in and mounting to a larger system, e.g., a ground station.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system. Moreover, the system has been described herein with respect to a satellite communications system, however, the present invention may be used in other applications, for example, terrestrial wireless communications systems, point-to-point communications systems, military/EW communications systems, millimeter wave radar systems, point-to-multipoint communications systems, and the like.

The invention claimed is:

1. A block-up converter comprising:
a subharmonic mixer;
  wherein said subharmonic mixer is configured to receive a first input signal, wherein said first input signal is an intermediate frequency signal;
  wherein said subharmonic mixer is further configured to receive a second input signal, wherein said second input signal is a local oscillator signal in the Ku band or lower;
  wherein said subharmonic mixer is configured to output a RF signal having a frequency greater than 26 GHz;
a filter configured to receive said RF signal and filter unwanted spurious signals which may be present in said RF signal; and
a power amplification device configured to receive said RF signal and to provide a desired signal gain;
wherein said subharmonic mixer, said filter, and said amplification device are located on a single multi-chip module, such that all signal interfaces with said multi-chip module occur at frequencies less than 26 GHz except for the final output of said RF signal from said multi-chip module; wherein said multi-chip module is configured to be surface mounted using a lead frame interface;
wherein said block-up converter is configured to be a high power block-up converter, wherein high power is defined to be any power greater than 1 Watt; and
wherein said block-up converter is configured to provide a high frequency output, wherein high frequency is defined to be any frequency greater than 26 GHz.

2. The block-up converter of claim 1, further comprising a wave-guide interface configured to output said RF signal from said multi-chip module.

3. The block-up converter of claim 1, further comprising an insert coupled to said high power amplification device, wherein said insert comprises a material characteristic of at least one of: high thermal conductivity and low thermal expansion properties.

4. The block-up converter of claim 1, further comprising a chassis and a cover, wherein said chassis and said cover are secured together to substantially encase said block-up converter.

5. The block-up converter of claim 1, wherein said multi-chip module is configured to be a drop-in component within the next higher assembly level.

6. A block-up converter comprising:
a subharmonic mixer;
  wherein said subharmonic mixer is configured to receive a first input signal, wherein said first input signal is an intermediate frequency signal;
  wherein said subharmonic mixer is further configured to receive a second input signal, wherein said second input signal is a local oscillator signal in the Ku band or lower;
  wherein said subharmonic mixer is configured to output a RF signal having a frequency greater than 26 GHz;
a filter configured to receive said RF signal and filter unwanted spurious signals which may be present in said RF signal; and
a power amplification device configured to receive said RF signal and to provide a desired signal gain;
  wherein said subharmonic mixer, said filter, and said amplification device are located on a single multi-chip module,
wherein said block-up converter is configured to be a high power block-up converter, wherein high power is defined to be any power greater than 1 Watt; and
wherein said block-up converter is configured to provide a high frequency output, wherein high frequency is defined to be any frequency greater than 26 GHz.

7. The black-up converter of claim 6, wherein said multi-chip module is configured to be surface mounted using a lead frame interface.

8. The block-up converter of claim 6, further comprising a wave-guide interface configured to output said RF signal from said multi-chip module.

9. The block-up converter of claim 6, further comprising an insert coupled to said high power amplification device, wherein said insert comprises a material characteristic of at least one of: high thermal conductivity and low thermal expansion properties.

10. The block-up converter of claim 6, further comprising a chassis and a cover, wherein said chassis and said cover are secured together to substantially encase said block-up converter.

11. The block-up converter of claim 6, wherein said maid-chip module is configured to be a drop-in component within the next higher assembly level.

12. A method for assembling a block-up converter on a single multi-chip module, the method comprising the steps of:
electrically connecting a subharmonic mixer on a multi-chip module to a filter on said multi-chip module;
  wherein said subharmonic mixer is configured to receive a first input signal, wherein said first input signal is an intermediate frequency signal;
  wherein said subharmonic mixer is further configured to receive a second input signal, wherein said second input signal is a local oscillator signal in the Ku band or lower;
  wherein said subharmonic mixer is configured to output a RF signal having a frequency greater than 26 GHz;

wherein said filter is configured to receive said RF signal and filter unwanted spurious signals which may be present in said RF signal; and electrically connecting said filter to a power amplification device that is also located on said multi-chip module, wherein said power amplification device is configured to receive said RE signal and to provide a desired signal gain;

wherein said block-up converter is configured to be a high power block-up converter, wherein high power is defined to be any power greater than 1 Watt; and wherein said block-up converter is configured to provide a high frequency output, wherein high frequency is defined to be any frequency greater than 26 GHz.

13. The method of claim 12, further comprising the step of electrically connecting said power amplification device to a wave-guide interface on said multi-chip module that is configured to output said RF signal from said multi-chip module.

14. The method of claim 12, further comprising the step of surface mounting said multi-chip module using a lead frame interface to the next higher assembly level.

15. The method of claim 12, further comprising the step of securing a chassis and a cover together to substantially encase said block-up convener.

16. The method of claim 14, further comprising the step of electrically connecting a driver amplifier, also located on said multi-chip module, between at least one of said sub-harmonic mixer, said filter, and said power amplification device.

* * * * *

UNITED STATES PATENT AND TRADEMARK OFFICE
CERTIFICATE OF CORRECTION

| | |
|---|---|
| PATENT NO. | : 7,035,617 B2 |
| APPLICATION NO. | : 10/066024 |
| DATED | : April 25, 2006 |
| INVENTOR(S) | : Buer et al. |

It is certified that error appears in the above-identified patent and that said Letters Patent is hereby corrected as shown below:

In column 5, line 59, change "Wart" to --Watt--.

In column 6, line 36, change "black-up" to --block-up--.

In column 6, line 52, change "maid-chip" to --multi-chip--.

In column 7, line 7, change "RE" to --RF--.

Signed and Sealed this

Twenty-second Day of August, 2006

JON W. DUDAS
*Director of the United States Patent and Trademark Office*